United States Patent
Bornoff et al.

(10) Patent No.: US 8,688,414 B2
(45) Date of Patent: Apr. 1, 2014

(54) IDENTIFICATION OF FLUID FLOW BOTTLENECKS

(75) Inventors: Robin Bornoff, Ross-on-Wye (GB); Byron Blackmore, Dartmouth (CA); John Parry, Surbiton (GB)

(73) Assignee: Mentor Graphics Corporation, Wilsonville, OR (US)

( * ) Notice: Subject to any disclaimer, the term of this patent is extended or adjusted under 35 U.S.C. 154(b) by 169 days.

(21) Appl. No.: 13/018,103

(22) Filed: Jan. 31, 2011

(65) Prior Publication Data

US 2012/0192641 A1 Aug. 2, 2012

(51) Int. Cl.
*G06F 7/60* (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS

| | | | | |
|---|---|---|---|---|
| 3,135,496 A * | 6/1964 | Scheper, Jr. | ................... | 415/117 |
| 5,537,641 A * | 7/1996 | da Vitoria Lobo et al. | ... | 345/419 |
| 5,953,239 A * | 9/1999 | Teixeira et al. | ................... | 703/6 |
| 6,089,744 A * | 7/2000 | Chen et al. | ......................... | 703/2 |
| 6,135,957 A * | 10/2000 | Cohen-Bacrie et al. | ...... | 600/438 |
| 7,600,845 B2 * | 10/2009 | Ishizaki | ........................... | 347/19 |
| 7,625,173 B2 * | 12/2009 | Mehring | .................... | 415/121.2 |
| 7,837,944 B2 * | 11/2010 | Auner et al. | ................... | 422/534 |
| 8,321,190 B2 * | 11/2012 | Hansen et al. | ................... | 703/10 |
| 2006/0136182 A1 * | 6/2006 | Vacanti et al. | ................... | 703/11 |
| 2010/0094603 A1 * | 4/2010 | Danko | .............................. | 703/2 |
| 2012/0232860 A1 * | 9/2012 | Rodriguez et al. | ................ | 703/2 |
| 2012/0245903 A1 * | 9/2012 | Sturdza et al. | .................... | 703/2 |

OTHER PUBLICATIONS

ANSYS Commands Reference ANSYS Release 7.1 May 2003 12 pages (including cover and title page) ANSYS, Inc.

* cited by examiner

*Primary Examiner* — Lisa Caputo
*Assistant Examiner* — Punam Roy (57) ABSTRACT

Techniques for determining one or more fluid flow characteristic values of a structure are disclosed. A fluid flow vector and a pressure gradient vector for a portion of the structure are determined, and a dot/cross product of the fluid flow vector with the pressure gradient vector is obtained to provide a fluid flow characteristic value. The fluid flow characteristic value can be used for modifying the structure to improve fluid flow through the structure.

33 Claims, 6 Drawing Sheets

IDENTIFICATION OF FLUID FLOW BOTTLENECKS

FIELD OF THE INVENTION

The present invention is directed to the analysis and visualization of fluid flow through various structures. Various aspects of the invention may be particularly useful for identifying regions in a structure that restrict the fluid flow to improve the structure design.

BACKGROUND OF THE INVENTION

Computational Fluid Dynamics (CFD) is a mathematical method of solving the governing equations of fluid flow on a computer and visualizing the resulting distribution of flow properties such as pressure, speed and temperature on a three-dimensional mesh. Such visualizations will enable observations of what the flow is doing but little insight into the reasons why. In terms of fluid flow, the amount of effort required to force fluid to move through a system at a desired speed is a function of the flow restrictive nature of that system.

The desire to minimize or control pressure differences in a fluid flow system is a reoccurring need when it comes to the design of a product that utilizes fluid (liquid or gas) to help achieve its function. System with excessive pressure drop require excessive energy input to drive the fluid at the required flow rates, via use of fans, pumps etc. The major geometric and flow features causing excessive pressure drop can, if identified, be redesigned to ease the flow of the fluid, reduce the pressure drop within the system and thus reduce the energy input required by the system.

A number of tools have been developed to analyze pressure drop and fluid flow rates within a system, including pitot tubes, hot wire anemometry, laser Doppler anemometry, et al. Computer modeling tools have been used to predict fluid speeds and pressure distributions. Valve manufacturers, for example, may employ computer modeling software to predict the fluid flow and pressure distribution in a fluidic valve, before it has even been manufactured.

While these tools have been useful in revealing fluid flow in various devices, they typically provide no guidance as to how a device can be modified to change its heat flow. Instead, a user, such as a product designer, usually must rely on his or her personal experience or broad design guidelines to determine how the fluid flow of a device can be improved. As a result, many product designers may overlook more efficient device modifications for improving fluid flow, and instead employ less effective, more bulky, and/or more expensive techniques to reduce temperature in a device.

BRIEF SUMMARY OF THE INVENTION

Aspects of the invention relate to techniques for determining one or more fluid flow characteristic values of a structure, such as a valve. Various embodiments of the invention will determine a fluid flow vector for a portion of the structure and a pressure gradient vector for the portion of the structure, and use these two vectors to derive one or more fluid flow characteristic values. Some implementations of the invention may determine the dot product of the fluid flow vector with the pressure gradient vector, to obtain a fluid flow bottleneck characteristic value. As used herein, a fluid flow "bottleneck" refers to a region or path of a structure where, if additional fluid flow could be channeled through that region, it would be beneficial to do so. As will be discussed in more detail below, relatively higher fluid flow bottleneck characteristic values indicate regions of a structure where fluid flow is more restricted than other regions of the structure regions (i.e., regions or paths having a significant amount of fluid flow but experiencing a higher flow resistance to that fluid flow than other regions or paths). Other implementations of the invention may alternately or additionally determine a cross product of the fluid flow vector with the pressure gradient vector to obtain a fluid flow shortcut characteristic value. As used herein, a fluid flow "shortcut" refers to a region or path through which substantially more fluid could be channeled (i.e., a region or path where a fluid flow path may be added, so as to cause the fluid flow to bypass to other regions or paths). As also will be discussed in more detail below, relatively higher fluid flow shortcut characteristic values indicate alternate or additional regions of a structure where additional fluid flow will improve the overall fluid flow.

The ability to determine where fluid flow bottlenecks exist in a structure enables a designer to make better informed fluid flow design decisions. For example, if a user was considering modifying a structure to make a single reduction in fluid flow resistance, relatively higher fluid flow bottleneck characteristic values would indicate where best to make the modifications so as to maximize the reduction in pressure drop within the structure. Similarly, the ability to determine where there are shortcut opportunities to insert new fluid flow paths in a structure enable a user to make better informed fluidic design decisions. For example, if a user was considering where to add a single new flow path to a structure, relatively higher fluid flow shortcut characteristic values would indicate where best to place the new channel or opening in the structure so as to shortcut the fluid flow to other areas, thus reducing the pressure drops within the structure.

With various implementations of the invention, the fluid flow characteristic values of a structure may be displayed to a user, stored for future use, or both. The structure may be modified based on the fluid flow characteristic values to improve its fluid flow. For example, the structure may be changed by introducing chamfers, fillets or other streamlining features, increasing/decreasing cross-sectional areas of flow paths or flow obstacles, punching holes or new flow channels in structures, or adding flow baffles to allow for additional fluid flow into other areas.

These and other features of the invention will be described in more detail below.

DETAILED DESCRIPTION OF THE INVENTION

Exemplary Operating Environment

Figure 1:
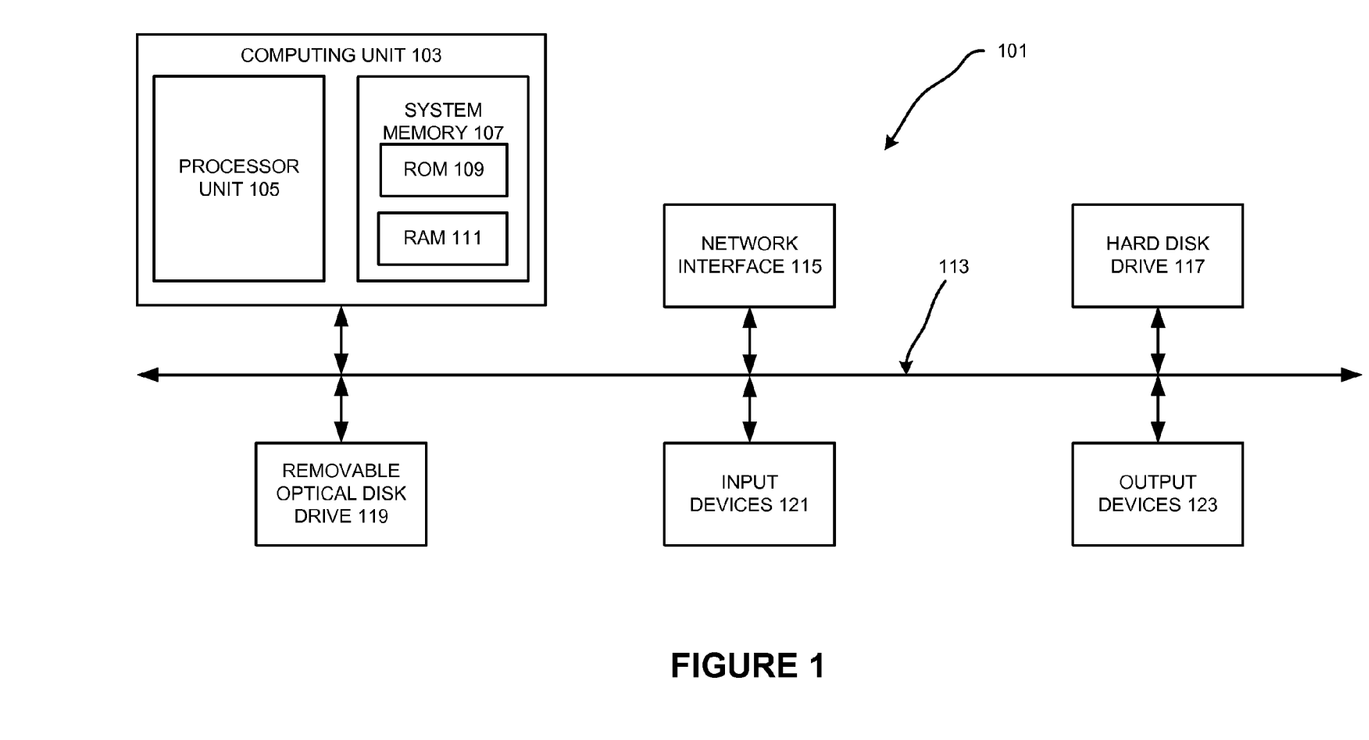
FIG. 1 illustrates an example of a programmable computer that may be used to implement a thermal analysis tool or method according to various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Fluid Flow Analysis Tool

Figure 2:
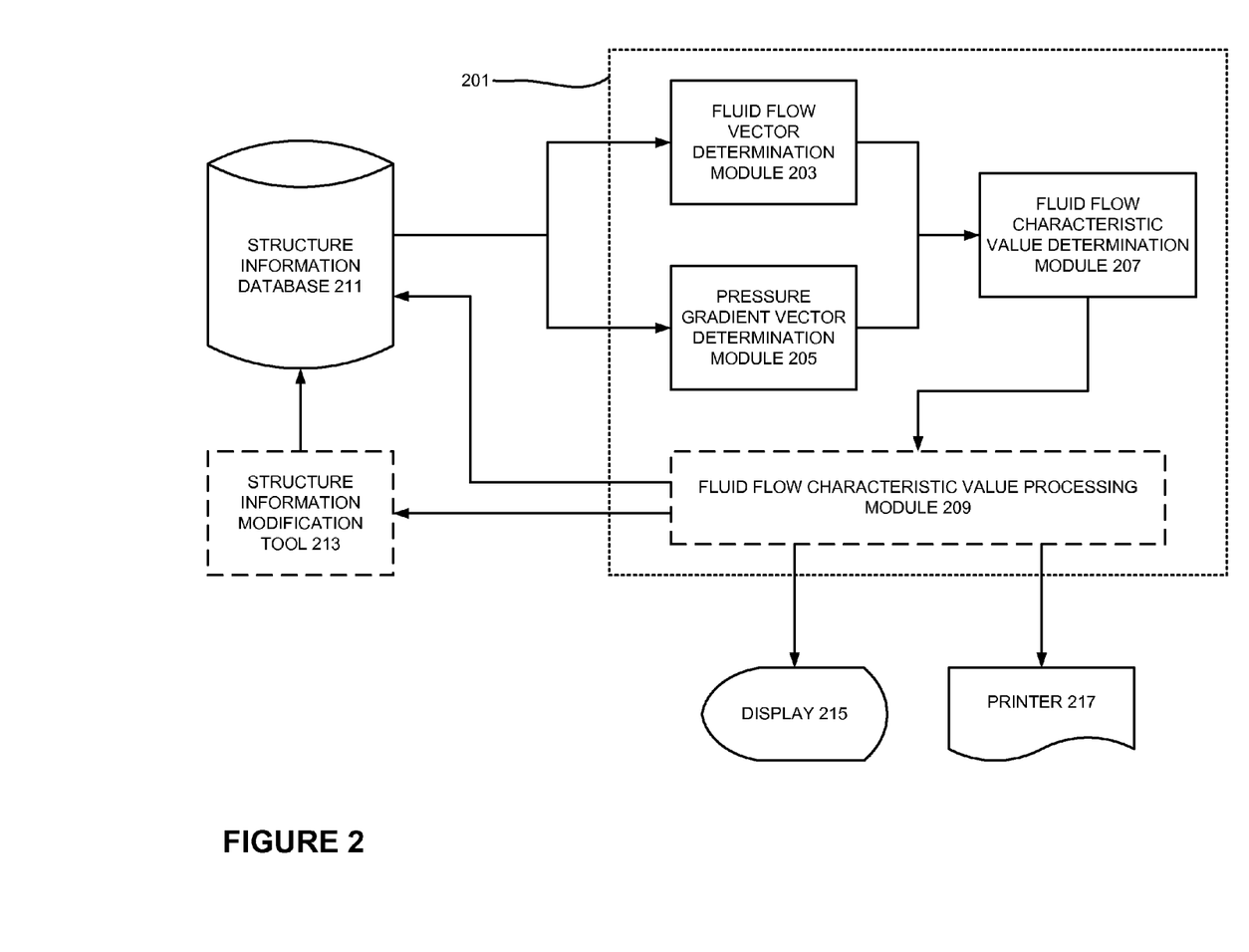
FIG. 2 illustrates a fluid flow analysis tool or method according to various embodiments of the invention.

FIG. 2 illustrates an example of a fluid flow analysis tool that may be provided according to various embodiments of the invention. As seen in this figure, the fluid flow analysis tool 201 includes a fluid flow vector determination module 203, a pressure gradient vector determination module 205, and a fluid flow characteristic value determination module 207. Some implementations of the fluid flow analysis tool 201 may optionally include a fluid flow characteristic value processing module 209. As will be discussed in more detail below, some implementations of the fluid flow analysis tool 201 may be employed with a structure information database 211, a structure information modification tool 213, a display 215, a printer 217, or some combination thereof.

With some embodiments of the invention, one or more of the fluid flow vector determination module 203, the pressure gradient vector determination module 205, the fluid flow characteristic value determination module 207, and the fluid flow characteristic value processing module 209 may be implemented by one or more programmable computers, such as the computer 101 shown in FIG. 1, executing programming instructions. Correspondingly, alternate embodiments of the invention may be implemented by software instructions for programming a programmable computer to perform the functions of one or more of the modules 203-209 stored on a computer-readable medium. The computer-readable medium may be, for example, a magnetic storage device, an optical storage device, a "punched" surface type device, or a solid state storage device.

As will be discussed in more detail below, the fluid flow vector determination module 203 is configured to obtain the flow vector of a portion of a structure, such as a valve. Similarly, the pressure gradient vector determination module 205 is configured to obtain the pressure gradient vector of a portion of a structure. With some implementations, the fluid flow vector determination module 203, the pressure gradient vector determination module 205, or both may passively receive their respective vector information from an outside source, such as a database or other fluid flow analysis tool. With still other implementations, however, the fluid flow vector determination module 203, the pressure gradient vector determination module 205, or both may be configured to calculate their respective vector information from raw data.

For example, if the fluid flow analysis tool 201 is being used to analyze a physical structure, then the fluid flow vector determination module 203, the pressure gradient vector determination module 205, or both may determine their respective vector information by applying computer modeling algorithms to fluid flow measurements of the structure. The fluid flow measurements may be, e.g., fluid pressure measured by pitot tubes and fluid flow measured by hot wire anemometers. Alternately, if the fluid flow analysis tool 201 is being used to analyze a virtual structure (e.g., a fluid flow structure design), then the fluid flow vector determination module 203, the pressure gradient vector determination module 205, or both may determine their respective vector information by applying computer modeling algorithms to design data describing the structure. Where the vector information is not provided, various implementations of the invention may use conventional fluid flow modeling software to determine the vector information from flow measurements or design data. For example, if the structure is a virtual description of a physical design utilizing fluid flow, various examples of the invention may employ the FloTHERM® family of software products available from Mentor Graphics Corporation of Wilsonville, Oreg., the FloEFD® family of software products available from Mentor Graphics Corporation of Wilsonville, Oreg., or the ANSYS® Icepak® software product available from Ansys, Inc., of Canonsburg, Pa., to implement the fluid flow vector determination module 203, the pressure gradient vector determination module 205, or both. As will be appreciated by those of ordinary skill in the art, As will also be discussed in more detail below, the fluid flow characteristic value determination module 207 is configured to determine a dot/cross product of the fluid flow vector with the pressure gradient vector. With some implementations of the invention, fluid flow characteristic value determination module 207 may obtain a cross product of the fluid flow vector with the pressure gradient vector, a dot product of the fluid flow vector with the pressure gradient vector, or both. The optional fluid flow characteristic value processing module 209 may then be configured to convert the products of the vectors into more convenient forms of fluid flow characteristic values. The fluid flow characteristic value processing module 209 may, for example, determine the absolute value of the vector products, normalize the vector products, or both.

As previously noted, some implementations of the invention may be employed with a structure information database 211, an optional structure information modification tool 213, a display 215, and/or a printer 217. For example, if the fluid flow analysis tool 201 is being used to analyze a design of a virtual fluid flow structure, the structure design information may be stored on and retrieved from the device information database 211. Also, if the fluid flow characteristic values are saved for future use, they may be stored in the structure information database 211. Similarly, if the fluid flow analysis tool 201 is being used to analyze a design of a virtual fluid flow structure, the structure information modification tool 213 may optionally be used to automatically modify the design data based upon fluid flow characteristic values provided by the fluid flow analysis tool 201. With some implementations of the invention, the fluid flow characteristic values may alternately or additionally be displayed to a user on a display 215 or a printer 217. The display 215 may be any conventional display, such as a CRT or LCD flat screen display. As will be appreciated by those of ordinary skill in the art, any conventional rendering software program may be used to render the fluid flow characteristic values on the display 215.

Determination of a Fluid Flow Characteristic Value

Figure 3A:
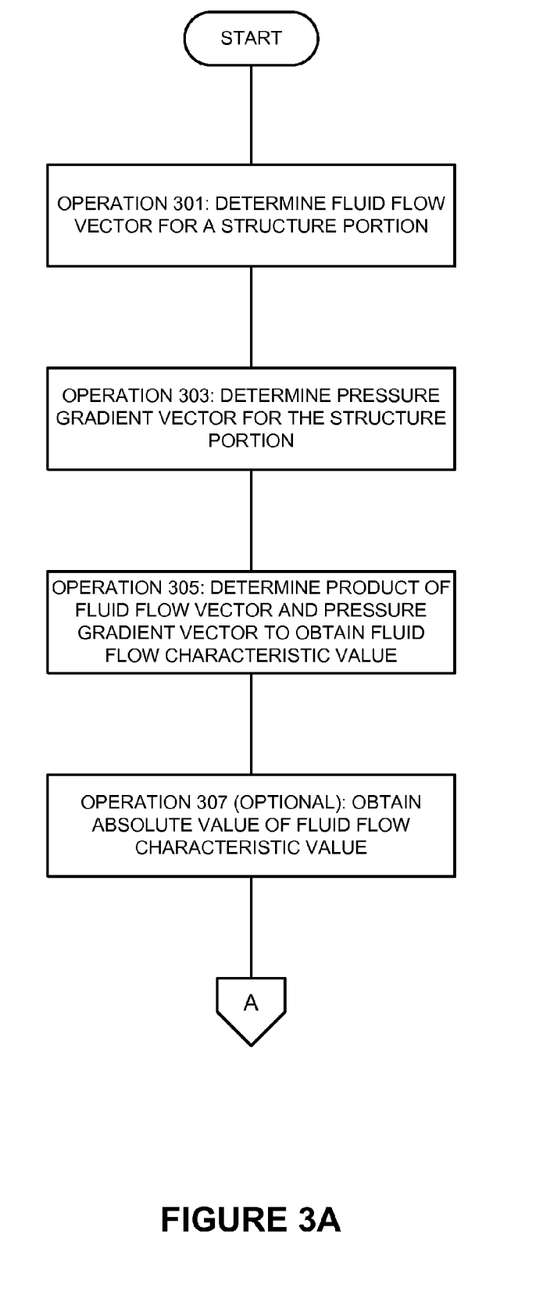
FIGS. 3A and 3B illustrate a flowchart showing methods of determining fluid flow characteristic values according to various embodiments of the invention.
Figure 3B:
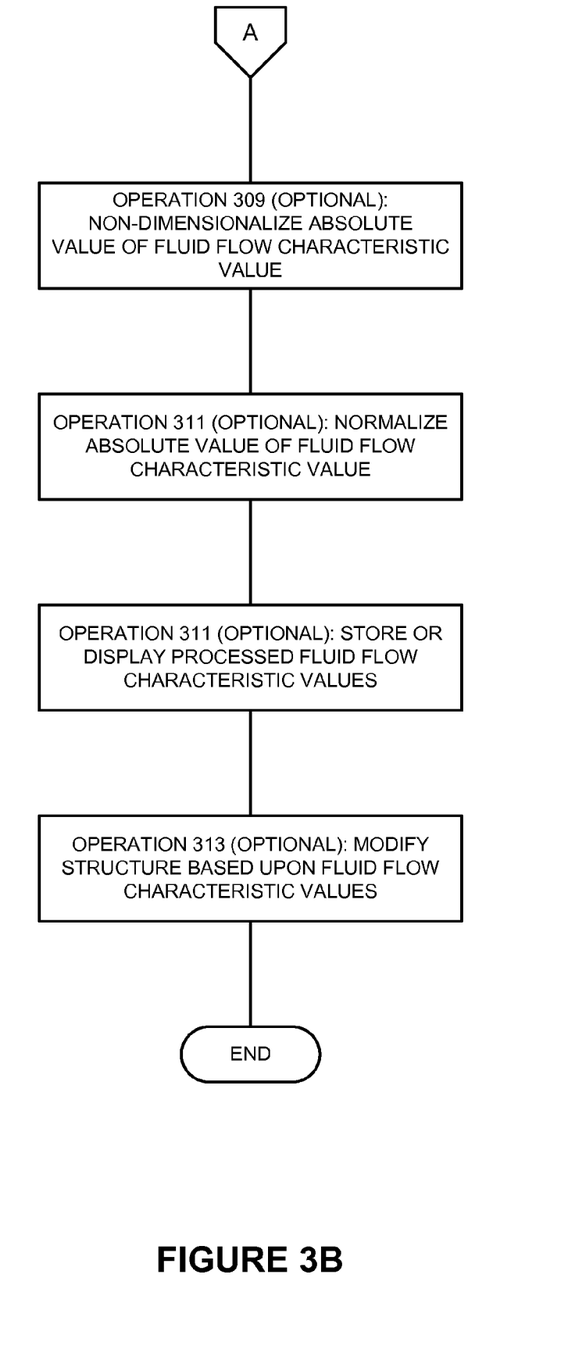

FIGS. 3A and 3B illustrate fluid flow analysis methods that may be employed according to various embodiments of the invention. For ease of understanding, these methods will be described with reference to the fluid flow analysis tool 201 illustrated in FIG. 2. It should be appreciated, however, that alternate implementations of a fluid flow analysis tool may be used to perform the fluid flow analysis methods shown in FIGS. 3A and 3B. Likewise, the fluid flow analysis tool 201 may be employed to perform other fluid flow analysis methods according to various embodiments of the invention.

Initially, in operation 301, the fluid flow vector determination module 203 determines a fluid flow vector for a portion of the structure being analyzed. The portion may be, for example, a specified location in or on the structure, or a region of the structure. The fluid flow vector may have various flow-related forms such as mass flux (unit $kg/(m^2 s)$), velocity, kinetic energy, (kinetic energy+turbulence kinetic energy), (kinetic energy+turbulence kinetic energy+hydrostatic pressure). The kinetic energy, the turbulence kinetic energy and the hydrostatic pressure may be defined as:

kinetic energy=0.5×fluid density×fluid velocity×fluid velocity  [1]

turbulent kinetic energy=0.5×fluid density×instantaneous velocity, time averaged then squared  [2]

hydrostatic pressure=fluid density×gravity×height of fluid level  [3]

Accordingly, the fluid flow vector determination module 203 may, for example, determine a fluid flow vector in the form of kinetic energy with units of $N/m^2$ (i.e., Newtons per meter-squared). The direction of the fluid flow vector is based on the direction of the velocity.

As previously noted, with some implementations of the invention, fluid flow vector determination module 203 may simply obtain a predetermined fluid flow vector from an outside source. With still other implementations of the invention, however, the fluid flow vector determination module 203 may calculate the fluid flow vector. If the structure being analyzed is a physical structure, then the fluid flow vector determination module 203 may calculate the fluid flow vector from flow measurements of the structure. If the structure being analyzed is a virtual structure, such as a design describing a fluid flow structure, then fluid flow vector determination module 203 may calculate the fluid flow vector from the design data. As previously noted, conventional fluid flow modeling software, such as the FloTHERM® family of software products available from Mentor Graphics Corporation of Wilsonville, Oreg., the FloEFD® family of software products available from Mentor Graphics Corporation of Wilsonville, Oreg., or the ANSYS® Icepak® software product available from Ansys, Inc., of Canonsburg, Pa., may be used to calculate the fluid flow vector.

Next, in operation 303, the pressure gradient vector determination module 205 determines a pressure gradient vector for the portion of the structure. The pressure gradient vector may have various forms such as static pressure gradient and total pressure gradient. Accordingly, the pressure gradient vector determination module 205 may determine a pressure gradient vector with units of $N/m^3$ (i.e., Newtons per meter-cube). As previously noted, with some implementations of the invention, the pressure gradient vector determination module 205 may simply obtain a predetermined pressure gradient vector from an outside source. With still other implementations of the invention, however, the pressure gradient vector determination module 205 may calculate the pressure gradient vector. If the structure being analyzed is a physical structure, then the pressure gradient vector determination module 205 may calculate the pressure gradient vector from pressure measurements of the structure. If the structure being analyzed is a virtual structure, then the pressure gradient vector determination module 205 may calculate the pressure gradient vector from the design data. As previously noted, conventional fluid flow modeling software, such as the FloTHERM® family of software products available from Mentor Graphics Corporation of Wilsonville, Oreg., the FloEFD® family of software products available from Mentor Graphics Corporation of Wilsonville, Oreg., or the ANSYS® Icepak® software product available from Ansys, Inc., of Canonsburg, Pa., may be used to calculate the pressure gradient vector, a fluid flow vector, or both. Of course, it will be appreciated that still other computer-aided engineering design tools that manipulate recorded and/or modeled fluid flow information may be used to implement the fluid flow vector determination module 203, the pressure gradient vector determination module 205, or both.

In operation 305, the fluid flow characteristic value determination module 207 determines a fluid flow characteristic value for the portion of the structure based upon its determined fluid flow vector and pressure gradient vector. More particularly, the fluid flow characteristic value determination module 207 obtains the product of the fluid flow vector with the pressure gradient vector to produce a fluid flow characteristic value for the portion of the structure. With some implementations of the invention, the fluid flow characteristic value determination module 207 may obtain the dot product of the fluid flow vector with the pressure gradient vector to produce a fluid flow bottleneck characteristic value. Still other implementations of the invention may obtain the cross product (or an operation related to the cross product) of the fluid flow vector with the pressure gradient vector to produce a fluid flow shortcut characteristic value.

As previously noted, to determine a fluid flow bottleneck characteristic value for a portion of a structure, the fluid flow characteristic value determination module 207 will obtain the dot product of the fluid flow vector with the pressure gradient vector. As will be appreciated by those of ordinary skill in the art, the dot product of these vectors is obtained by multiplying the magnitude of the fluid flow vector by the magnitude of the pressure gradient vector and by the cosine of the angle between the directions of the fluid flow vector and the pressure gradient vector. The dot product is typically described by the following formula [4]:

$$a \cdot b = |a||b| \cos \theta \quad [4]$$

where θ is the measure of the smaller angle between a and b ($0° \leq \theta \leq 180°$), and a and b are the magnitudes of vectors a and b.

The resulting product is a scalar value. With some implementations of the invention, the fluid flow characteristic value determination module 207 will multiply the absolute values of the magnitude of the mass flow vector and the magnitude of the gauge pressure gradient vector with the absolute value of the cosine of the angle between the directions of the mass flow vector and the gauge pressure gradient vector to obtain the dot product. Alternately, the fluid flow characteristic value determination module 207 may simply obtain the absolute value of the resulting scalar value in a later operation. With various implementations of the invention, the units of such a dot product may be, for example, $N^2/m^5$.

To determine the fluid flow shortcut characteristic value for the portion of the structure, the fluid flow characteristic value determination module 207 obtains the cross product (or a related operation) of the fluid flow vector with the pressure gradient vector. As will be appreciated by those of ordinary skill in the art, the cross product of two vectors a×b is defined as a vector c that is perpendicular to both a and b, with a direction given by the right-hand rule and a magnitude equal to the area of the parallelogram that the vectors span. The cross product is typically described by the following formula [5]:

$$a \times b = ab \sin \theta n \quad [5]$$

where θ is the measure of the smaller angle between a and b ($0° \leq \theta \leq 180°$), a and b are the magnitudes of vectors a and b, respectively, and n is a unit vector perpendicular to the plane containing a and b in the direction given by the right-hand rule.

With some embodiments of the invention, the fluid flow shortcut characteristic value will be a scalar value. Accordingly, some implementations of the invention may obtain the true cross product of the fluid flow vector with the pressure gradient vector (or the true cross product of pressure gradient vector with the fluid flow vector), and then obtain the magnitude (or the absolute value of the magnitude) of the resulting vector as a scalar value. Still other implementations of the invention may obtain the scalar value simply by multiplying the magnitude of the fluid flow vector by the magnitude of the pressure gradient vector and the sine of the angle between the directions of the vectors in a "truncated" cross product operation. Accordingly, as used herein, the term "cross product" is intended to include both a true cross product (as defined by the formula [2] above) and the "truncated" cross product described above. With some implementations of the invention, the fluid flow characteristic value determination module 207 will multiply the absolute value of the magnitude of the fluid flow vector and the absolute value of the magnitude of the pressure gradient vector with the absolute value of the sine of the angle between the directions of the vectors to obtain the truncated cross product. Alternately, the fluid flow characteristic value determination module 207 may simply obtain the absolute value of the resulting scalar value in a later operation. As with the fluid flow bottleneck characteristic value, the fluid flow shortcut characteristic value may be expressed in units of, for example, $N^2/m^5$.

Next, in operation 307, the fluid flow characteristic value processing module 209 will obtain the absolute values of the fluid flow characteristic values produced by the fluid flow characteristic value determination module 207. It should be appreciated that this operation is optional for various implementations of the invention, particularly where this operation has already been performed, either inherently or expressly, by the calculations performed by the fluid flow characteristic value determination module 207 as discussed in detail above.

It should be appreciated that operations 301-307 typically will be repeated until the bottleneck fluid flow characteristic value has been determined for a plurality of portions of the structure, so that the bottleneck fluid flow characteristic value is determined for some or all of the structure. As will be discussed in more detail below, by comparing the fluid flow bottleneck characteristic values for multiple portions of the structure, a user can identify areas where, if the fluid flow could pass more easily, the energy required to do so would be reduced (i.e., the regions having relatively higher fluid flow bottleneck characteristic values).

In operation 309, the fluid flow characteristic value processing module 209 may also optionally non-dimensionalize the fluid flow characteristic values. For example, if the structure is a virtual structure, and the fluid flow vector and the pressure gradient vector are obtained from using a computerized model of the structure, then the fluid flow characteristic value processing module 209 may non-dimensionalize the fluid flow bottleneck characteristic values by dividing the fluid flow characteristic values by the total static pressure drop in the system multiplied by the kinetic energy of the fluid entering the system, which may have units of $N^2/m^5$. defined as an input to the model, and by the total pressure drop exhibited by the model, $P_{max}$-$P_{min}$, obtained as a result of the simulation. Similarly, if the structure is a physical structure, and the fluid flow vector and the pressure gradient vector are obtained from making measurements of the structure, then the fluid flow characteristic value processing module 209 may non-dimensionalize the fluid flow bottleneck characteristic value by dividing the fluid flow characteristic values by the total static pressure drop in the system multiplied by the kinetic energy of the fluid entering the system, which may have units of $N^2/m^5$ measured for the structure, and by the total pressure drop exhibited by the model, $P_{max}-P_{min}$, obtained as a result of the simulation.

Alternately or additionally, in operation 311 the fluid flow characteristic value processing module 209 may also normalize the bottleneck fluid flow characteristic values. The fluid flow bottleneck characteristic values may be normalized by dividing these values by the maximum fluid flow bottleneck characteristic value determined for the structure, thus producing a range with a maximum value of one. Similarly, the fluid flow characteristic value processing module 209 may alternately or additionally normalize the fluid flow shortcut characteristic values by dividing these values by the maximum fluid flow shortcut characteristic value determined for the structure, thus producing a range with a maximum value of one. Of course still other techniques could be employed to normalize or non-dimensionalize either the fluid flow bottleneck characteristic values, the fluid flow shortcut characteristic values, or both.

Use of a Thermal Characteristic Value

In operation 313, the fluid flow analysis tool 201 may output the fluid flow characteristic values to a data storage device, such as the structure information database 211, to the display (or displays) 215, the printer (or printers) 217, or both for viewing by a user, or to some combination of output devices. With some embodiments of the invention, the fluid flow characteristic values may be rendered in a two-dimensional or three-dimensional representation of the structure. With these implementations of the invention, the fluid flow characteristic values for each portion of the structure may be displayed (or otherwise represented) in the map at a location corresponding to that portion of the structure. For example, the fluid flow characteristic values may be rendered to show their relative magnitudes using, e.g., colors or shading. Of course, still other implementations can use a wide variety of techniques to render the heat transfer characteristic values, including, for example,

- Colored variation on a two-dimensional 'slice' through a 3D model;
- A two-dimensional 'isosurface' (i.e., a two-dimensional surface rendered in a three-dimensional model showing a surface of constant fluid flow bottleneck characteristic values or fluid flow shortcut characteristic values;
- Coloring of lines that follow fluid flow in a simulation, colored according to scalar fields of the fluid flow bottleneck characteristic values or fluid flow shortcut characteristic values that they pass through; and
- Colored plots on the image of a structure's surfaces indicating the variation of the fluid flow bottleneck characteristic values or fluid flow shortcut characteristic values on those surfaces.

Alternately or additionally, various implementations of the invention may show fluid flow characteristic values in a table.

Next, in operation 313, the structure may be modified based upon the fluid flow characteristic values. With some implementations, the modifications may be made manually by a user viewing a rendering of the fluid flow characteristic values. As will be appreciated by those of ordinary skill in the art based upon the foregoing description, a visual inspection of the variation of the fluid flow bottleneck characteristic values would allow determination of where a structure should be modified so as to result in a decrease of pressure drops within the structure. More particularly, the portions of the structure with the highest fluid flow bottleneck characteristic values are the locations where changes should be made to the structure if pressure drops within the design are to be reduced. As a result, in operation 313 changes may be made to the structure that will reduce resistance to fluid flow in that portions of the structure with the relatively higher fluid flow bottleneck characteristic values.

Figure 4A:
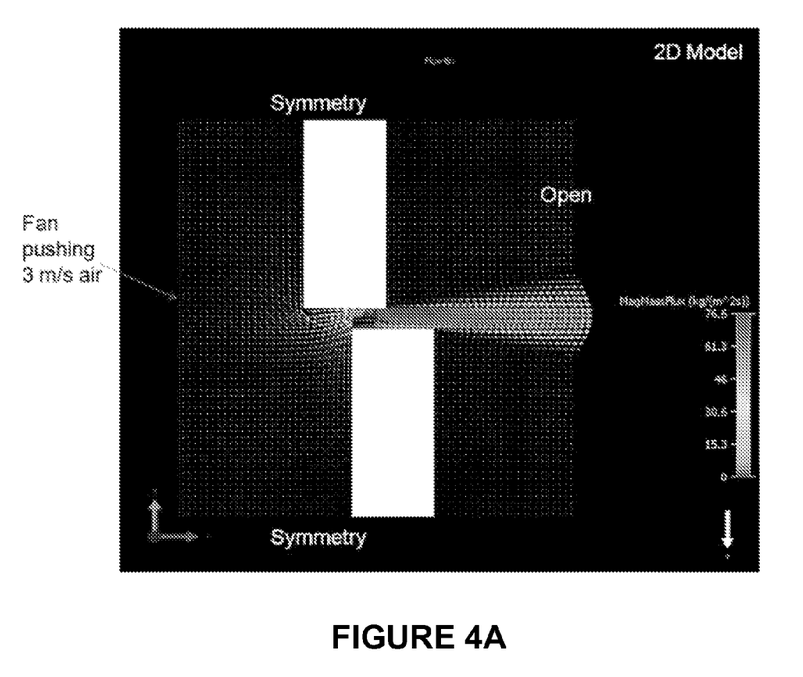
FIG. 4A illustrate air being forced through a structure that includes a constricted orifice in a wall.
Figure 4B:
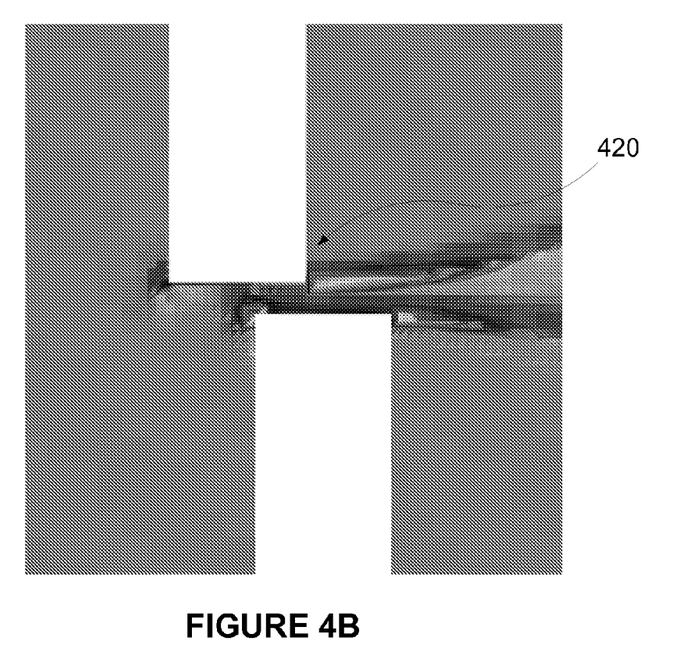
FIG. 4B illustrate a graph of fluid flow bottleneck characteristic values for the structure shown in FIG. 4A.
Figure 5:
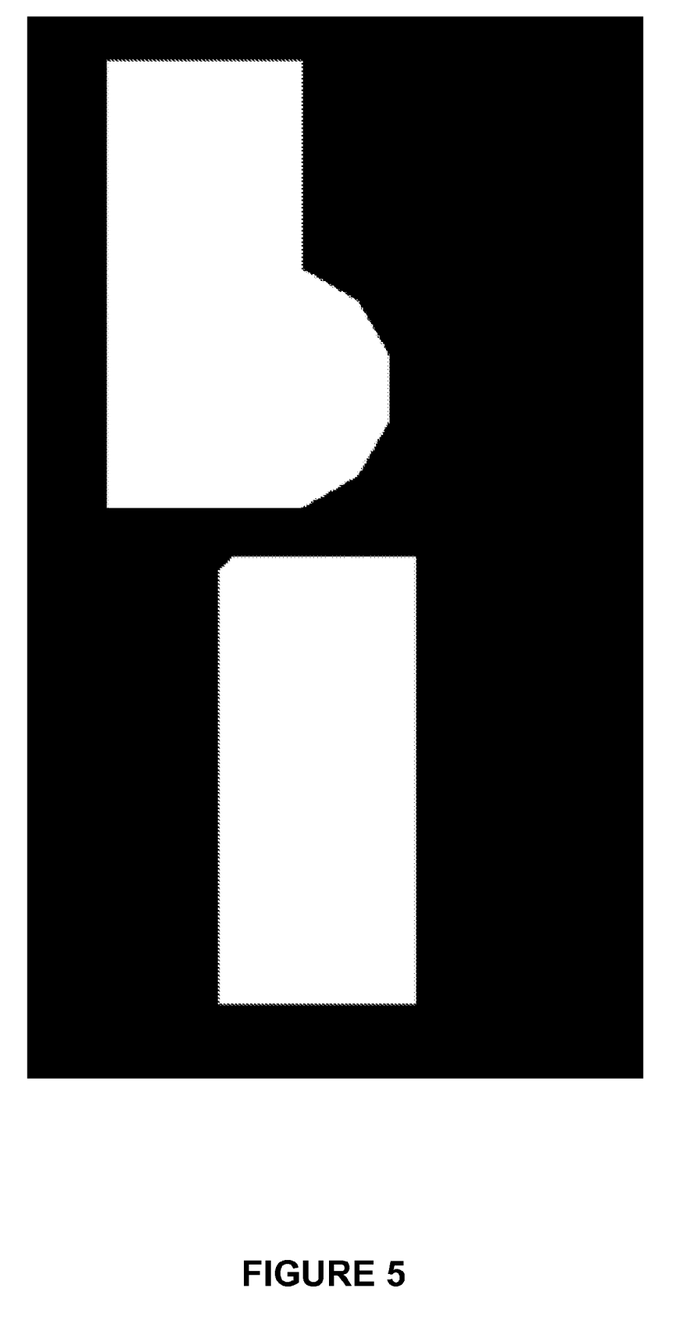
FIG. 5 illustrates a structure derived by modifying the structure shown in FIG. 4A based on the graph of fluid flow bottleneck characteristic values shown in FIG. 4B.

For example, FIG. 4A illustrate air being forced through a structure that includes a constricted orifice in a wall. As will be appreciate from this figure, a mass flux image indicates the regions with very high mass flux values, but the image provide a designer with little or no information on how the fluid flow can be improved. FIG. 4B then a graph of fluid flow bottleneck characteristic values for the structure shown in FIG. 4A. As noted above, the higher (i.e., more red) fluid flow bottleneck characteristic values indicate locations where changes should be made to the structure. Thus, FIG. 4B indicate that, for example, if region 420 of the structure can be modified to have less resistance to fluid flow. FIG. 5 illustrates a structure derived by modifying the structure shown in FIG. 4A based on the graph of fluid flow bottleneck characteristic values shown in FIG. 4B.

Also, while a designer may manually make changes to a design based upon the fluid flow characteristic values, various embodiments of the invention may alternately or additionally work with or incorporate a tool for automatically making changes to a structure based upon heat transfer characteristic values, such as the structure information modification tool 213. This type of tool may use, e.g., heuristics or other conventional design techniques to automatically make changes to a virtual structure in response to the fluid flow characteristic values provided by the fluid flow characteristic value determination module 207, the fluid flow characteristic value processing module 209, or both.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic or mechanical computer-aided engineering (CAE) design processes, it should be appreciated that various examples of the invention may be implemented using any desired combination of design processes.

What is claimed is:

1. A method of analyzing fluid flow in a portion of a structure, comprising
   determining a fluid flow vector for the portion of the structure;
   determining a pressure gradient vector for the portion of the structure;
   determining a fluid flow characteristic value for the portion of the structure by obtaining a product of the fluid flow vector with the pressure gradient vector; and
   displaying or storing the fluid flow characteristic value.

2. The method recited in claim 1, wherein the determining a fluid flow characteristic value comprising:
   determining a fluid flow bottleneck characteristic value for the portion of the structure by obtaining an absolute value of a dot product of the fluid flow vector with the pressure gradient vector.

3. The method recited in claim 1, wherein the determining a fluid flow characteristic value comprising:
   determining a fluid flow shortcut characteristic value for the portion of the device by obtaining a magnitude of a cross product of the fluid flow vector with the pressure gradient vector.

4. The method recited in claim 1, further comprising normalizing the fluid flow characteristic value.

5. A fluid flow analysis tool, comprising:
a fluid flow vector determination module comprising one or more processors configured to determine a fluid flow vector for a portion of a device;
a pressure gradient vector determination module configured to determine a pressure gradient vector for the portion of the heat device; and
a fluid flow characteristic value determination module configured to determine a fluid flow characteristic value for the portion of the heat device by obtaining a product of the fluid flow vector with the pressure gradient vector.

6. The fluid flow analysis tool recited in claim 5, wherein the fluid flow characteristic value determination module is configured to determine a fluid flow bottleneck characteristic value for the portion of the device by obtaining a magnitude of a dot product of the fluid flow vector with the pressure gradient vector.

7. The fluid flow analysis tool recited in claim 5, wherein the fluid flow characteristic value determination module is configured to determine a fluid flow shortcut characteristic value for the portion of the device by obtaining a magnitude of a cross product of the fluid flow vector with the pressure gradient vector.

8. The fluid flow analysis tool recited in claim 5, further comprising a display for displaying an image corresponding to one or more fluid flow characteristic values determined by the fluid flow characteristic value determination module.

9. The fluid flow analysis tool recited in claim 5, further comprising a printer for printing an image corresponding to one or more fluid flow characteristic values determined by the fluid flow characteristic value determination module.

10. A method of analyzing fluid flow in a plurality of portions of a structure, comprising:
determining respective fluid flow vectors for the plurality of portions of the structure;
determining respective pressure gradient vectors for the plurality of portions of the structure;
determining respective fluid flow characteristic values for the plurality of portions of the structure by obtaining a product of the respective fluid flow vectors with the respective pressure gradient vectors for the portions; and
displaying or storing the fluid flow characteristic values.

11. The method recited in claim 10, further comprising:
generating a fluid flow characteristic image of at least a part of the structure containing at least some of the portions, image pixel values of the image being derived from the determined fluid flow characteristic values for the portions of the structure in the image; and
displaying the fluid flow characteristic image on a display, or storing the fluid flow characteristic image.

12. The method recited in claim 10, further comprising altering the structure in at least some of those portions of the structure with a relatively fluid flow characteristic value.

13. The method recited in claim 10, wherein one type of the fluid flow characteristic values is fluid flow bottleneck characteristic values determined for the portions of the structure by obtaining a dot product of the respective fluid flow vectors with the respective pressure gradient vectors.

14. The method recited in claim 13, further comprising displaying or storing the fluid flow bottleneck characteristic values.

15. The method recited in claim 13, further comprising altering the structure in at least some of those portions of the structure with a relatively high fluid flow bottleneck characteristic value.

16. The method recited in claim 10, wherein one type of the fluid flow characteristic values is fluid flow shortcut characteristic values determined for the portions of the structure by obtaining a magnitude of a dot product of the respective fluid flow vectors with the respective pressure gradient vectors.

17. The method recited in claim 16, further comprising displaying or storing the fluid flow shortcut characteristic values.

18. The method recited in claim 16, further comprising altering the structure in at least some of those portions with a relatively fluid flow shortcut characteristic value.

19. The method recited in claim 10, further comprising normalizing the respective fluid flow characteristic values.

20. One or more non-transitory computer-readable media storing computer-executable instructions for causing one or more processors to perform a method, the method comprising:
determining a fluid flow vector for the portion of the structure;
determining a pressure gradient vector for the portion of the structure;
determining a fluid flow characteristic value for the portion of the structure by obtaining a product of the fluid flow vector with the pressure gradient vector; and
displaying or storing the fluid flow characteristic value.

21. The one or more non-transitory computer-readable media recited in claim 20, wherein the determining a fluid flow characteristic value comprising:
determining a fluid flow bottleneck characteristic value for the portion of the structure by obtaining an absolute value of a dot product of the fluid flow vector with the pressure gradient vector.

22. The one or more non-transitory computer-readable media recited in claim 20, wherein the determining a fluid flow characteristic value comprising:
determining a fluid flow shortcut characteristic value for the portion of the device by obtaining a magnitude of a cross product of the fluid flow vector with the pressure gradient vector.

23. The one or more non-transitory computer-readable media recited in claim 20, wherein the method further comprises normalizing the fluid flow characteristic value.

24. One or more non-transitory computer-readable media storing computer-executable instructions for causing one or more processors to perform a method, the method comprising:
determining respective fluid flow vectors for the plurality of portions of the structure;
determining respective pressure gradient vectors for the plurality of portions of the structure;
determining respective fluid flow characteristic values for the plurality of portions of the structure by obtaining a product of the respective fluid flow vectors with the respective pressure gradient vectors for the portions; and
displaying or storing the fluid flow characteristic values.

25. The one or more non-transitory computer-readable media recited in claim 24, wherein the method further comprises:
generating a fluid flow characteristic image of at least a part of the structure containing at least some of the portions, image pixel values of the image being derived from the determined fluid flow characteristic values for the portions of the structure in the image; and
displaying the fluid flow characteristic image on a display, or storing the fluid flow characteristic image.

26. The one or more non-transitory computer-readable media recited in claim 24, wherein the method further comprises:
  altering the structure in at least some of those portions of the structure with a relatively fluid flow characteristic value.

27. The one or more non-transitory computer-readable media recited in claim 24, wherein one type of the fluid flow characteristic values is fluid flow bottleneck characteristic values determined for the portions of the structure by obtaining a dot product of the respective fluid flow vectors with the respective pressure gradient vectors.

28. The one or more non-transitory computer-readable media recited in claim 27, wherein the method further comprises:
  displaying or storing the fluid flow bottleneck characteristic values.

29. The one or more non-transitory computer-readable media recited in claim 27, wherein the method further comprises:
  altering the structure in at least some of those portions of the structure with a relatively high fluid flow bottleneck characteristic value.

30. The one or more non-transitory computer-readable media recited in claim 24, wherein one type of the fluid flow characteristic values is fluid flow shortcut characteristic values determined for the portions of the structure by obtaining a magnitude of a dot product of the respective fluid flow vectors with the respective pressure gradient vectors.

31. The one or more non-transitory computer-readable media recited in claim 30, wherein the method further comprises:
  displaying or storing the fluid flow shortcut characteristic values.

32. The one or more non-transitory computer-readable media recited in claim 30, wherein the method further comprises:
  altering the structure in at least some of those portions with a relatively fluid flow shortcut characteristic value.

33. The one or more non-transitory computer-readable media recited in claim 24, wherein the method further comprises:
  normalizing the respective fluid flow characteristic values.

* * * * *